United States Patent [19]

Blizzard et al.

[11] Patent Number: 4,476,188
[45] Date of Patent: Oct. 9, 1984

[54] COMPOSITIONS PRODUCING AMINOFUNCTIONAL SILICONE FOAMS AND COATINGS

[75] Inventors: John D. Blizzard, Bay City; Terence J. Swihart, Essexville, both of Mich.

[73] Assignee: Dow Corning Corporation, Midland, Mich.

[21] Appl. No.: 597,639

[22] Filed: Apr. 6, 1984

Related U.S. Application Data

[62] Division of Ser. No. 565,072, Dec. 23, 1983, Pat. No. 4,460,712.

[51] Int. Cl.³ ............................................ C08F 283/12
[52] U.S. Cl. .................................... 428/332; 428/447; 521/77; 521/154; 524/430; 525/478; 528/31; 528/33; 528/38
[58] Field of Search ................ 428/332, 447; 521/77, 521/154; 525/478; 524/430; 528/31, 33, 38

[56] References Cited

U.S. PATENT DOCUMENTS 3,085,908 4/1963 Morehouse et al. ............... 428/336
3,355,424 11/1967 Brown ................................ 528/30
4,322,518 3/1982 Blizzard ............................. 528/21

*Primary Examiner*—Morton Foelak
*Attorney, Agent, or Firm*—Andrew H. Ward

[57] ABSTRACT

Compositions that cure rapidly to produce silicone foams and protective coatings are disclosed. These compositions comprise: (A) a certain liquid copolymeric polyorganosiloxane; and (B) an amino functional silicone polymer. For example, simple mixtures of the liquid copolymeric polyorganosiloxane and a polydiorganosiloxane having aminoalkyl substituents can be mixed together to form a resilient silicone foam. If the foam compositions are further provided with certain mineral fillers, a high degree of fire resistance is attained.

9 Claims, No Drawings

COMPOSITIONS PRODUCING AMINOFUNCTIONAL SILICONE FOAMS AND COATINGS

This application is a division of application Ser. No. 565,072, filed Dec. 23, 1983, now U.S. Pat. No. 4,460,712.

BACKGROUND OF THE INVENTION

The present invention relates to aminofunctional silicone compositions that produce useful, curable foams and coatings, and to a method for preparing foams.

Curable silicone coating compositions are well known. Especially pertinent to the present invention among such coatings are the curable silicone compositions disclosed in U.S. Pat. No. 4,322,518, issued Mar. 30, 1982 to J. Blizzard and assigned to the assignee of the present invention. In said U.S. patent, there are disclosed compositions comprising: (1) certain liquid copolymeric organopolysiloxanes comprising $SiO_{4/2}$ units, silicon-bonded hydroxyl radicals and/or silicon-bonded hydrogen radicals; and (2) polydiorganosiloxanes in which the organic radical substituents are monovalent hydrocarbon radicals, with each polydiorganosiloxane containing, on average, at least 2 vinyl radicals or silicon-bonded hydroxyl radicals.

The use of aminofunctional silicone compositions to provide coatings is also known. U.S. Pat. No. 3,085,908, issued Apr. 16, 1963, discloses a process for treating metal surfaces with aminofunctional silicones.

By aminofunctional silicone it is meant herein a polyorganosiloxane substituted with at least one alkyl radical bearing at least one amino group. Said alkyl radical is bonded to a silicon atom by a Si—C bond. The term aminofunctional silicone as used herein is intended to encompass silicones having alkyl radicals bearing one or more amino group.

U.S. Pat. No. 3,355,424, issued Nov. 28, 1967, discloses aminofunctional copolymeric silicones that are useful as coatings.

None of the above three patents disclose compositions that can be used to produce foams. Moreover, the compositions of U.S. Pat. Nos. 3,085,908 and 3,355,424 are mainly suitable for thin, corrosion protective films and are not suitable for thicker coatings.

SUMMARY OF THE INVENTION

It is an object of the present invention to provide aminofunctional silicone compositions that can be cured to provide foams. It is a further object that said compositions provide mechanically strong foams and coatings. It is a particular object that said compositions provide mineral-filled foams that are resistant to fire. It is another object to provide an all-silicone foam.

These objects, and other which will become apparent, are realized by the compositions and method of the present invention.

The present invention deals with a composition comprising a combination of:
(A) a certain liquid copolymeric organosilicon resin, and,
(B) an aminofunctional silicone fluid polymer.

DETAILED DESCRIPTION OF THE INVENTION

The present invention relates to a composition comprising, in combination (A) the reaction product of
(i) an organosilicon resin consisting essentially of $R_3SiO_{\frac{1}{2}}$ units and $SiO_{4/2}$ units, wherein R represents a monovalent hydrocarbon radical, and the ratio of $R_3SiO_{\frac{1}{2}}$ unit to $SiO_{4/2}$ units is from 0.6/1 to 0.9/1, and
(ii) a polyorganohydrogen siloxane; and
(B) an aminofunctional silicone fluid polymer having the general unit formula $R'_aQ_bSiO_{(4-a-b)/2}$, wherein in said unit formula
R' is selected from the group consisting of monovalent hydrocarbon radicals, hydroxy radicals, and alkoxy radicals;
Q is an aminofunctional radical; the sum of the values of a and b is an average of at least 1;
there being, in said aminofunctional silicone fluid polymer, at least one Q radical.

In another aspect, the present invention deals with a method for producing a silicone foam with the above combination, and to the silicone foams produced thereby.

Component (A) of the compositions of the present invention is the reaction product of: (i) an organosilicon resin consisting essentially of $R_3SiO_{\frac{1}{2}}$ units and $SiO_{4/2}$ units, wherein R is a monovalent hydrocarbon radical and the ratio of $R_3SiO_{\frac{1}{2}}$ units to $SiO_{4/2}$ units is from 0.6/1 to 0.9/1 and (ii) a polyorganohydrogensiloxane.

Component (A) of the compositions of the present invention is disclosed in U.S. Pat. No. 4,310,678, issued Jan. 12, 1982 to Blizzard and Swihart and assigned to the assignee of the present invention. The specification of U.S. Pat. No. 4,310,678 is hereby incorporated into the present specification by reference to describe component (A) of the present invention and to teach methods of synthesizing said component (A).

Briefly stated, component (A) can be synthesized by reacting together:
(i) an organosilicon resin consisting essentially of $R_3SiO_{\frac{1}{2}}$ units and $SiO_{4/2}$ units in the ratio stated above; and
(ii) a polyorganohydrogensiloxane.

R of reactant (i) represents a monovalent hydrocarbon radical, that is, a monovalent radical composed of hydrogen atoms and carbon atoms. R can thus be an alkyl radical, such as methyl, ethyl, butyl, propyl and the like; an alkenyl or cycloalkenyl radical, such as vinyl allyl, cyclopentenyl and the like; an aryl radical, such as phenyl, tolyl, xylyl and the like; an arylalkyl radical, such as beta-phenylethyl, beta-phenylpropyl and the like; or a cycloaliphatic radical, such as cyclohexyl, cyclopentyl, cycloheptyl and the like. Preferably R is a lower alkyl radical, such as methyl, ethyl or propyl. Most preferably, R is a methyl radical. Reactant (i) contains from 0.1% to 5% by weight, based on the total weight of reactant (i), of hydroxyl radicals bonded to silicon atoms. Minor proportions of alkoxy radicals are often unintentionally present in organosilicon resins. The presence of alkoxy radicals in reactant (i) is not thought to have any effect on the ultimate compositions of the present invention.

Preferably, reactant (i) is comprised of 1 to 5% by weight of silicon-bonded hydroxyl radicals, based on the total weight of reactant (i).

For the purpose of making component (A), reactant (i) is furnished dispersed in an organic solvent. A particular organic solvent is not critical, although is is advantageous to select an organic solvent which forms an azeotrope with water. Such organic solvents are well known for this purpose, and include, for example, benzene, toluene, xylene, and trichloroethane.

Organosilicon resins useful as reactant (i) are well known. Said resins, and their synthesis, are described in U.S. Pat. No. 2,676,182, issued Apr. 20, 1954, which patent is incorporated herein by reference to teach a method of synthesis for reactant (i).

To summarize a preferred method of synthesis of reactant (i), the following steps are followed:
1. An aqueous solution of sodium silicate is acidified to a pH value of less that about 5;
2. The resulting mixture is treated with a source of $R_3SiO_{\frac{1}{2}}$ units;
3. The mixture from step 2 is heated, then cooled;
4. The product of step 3 is fractionally extracted with an appropriate, water-immiscible organic solvent.

An organosilicon resin suitable for use as reactant (i) will then be isolated in the organic solvent fraction.

Sources of $R_3SiO_{\frac{1}{2}}$ units include compounds having the general formula $R_3SiX$, wherein X is a hydrolyzable radical, such as a halogen radical, or alkoxy radical; or a disiloxane of the general formula $(R_3Si)_2O$; or other sources of $R_3SiO_{1/8}$ units known to those skilled in the art.

Preferably, the extraction in step 4 above is carried out in such a manner that from 0.0018 to 0.018 equivalents of acid per gram of reactant (i) remain in the solvent/reactant (i) fraction.

Reactant (ii) of component (A) of the compositions of the present invention is a polyorganohydrogensiloxane, as described in U.S. Pat. No. 4,322,518. By polyorganohydrogensiloxane it is meant herein a liquid polyorganosiloxane containing an average of at least one silicon-bonded H radical per molecule.

Reactant (ii) can have a linear, cyclic, or branched polymeric structure, or appropriate combinations of these structures, provided that said reactant (ii) is a liquid. Radicals of reactant (ii) that are not silicon-bonded hydrogen radicals are selected from monovalent hydrocarbon radicals as hereinabove described. A linear polyorganohydrogensiloxane consisting essentially of $(CH_3)(H)SiO$ units, and having a degree of polymerization of from 25 to 75 repeat units is a preferred reactant (ii).

Polyorganohydrogensiloxanes suitable for use as reactant (ii) are well known; many are available commercially. Said polyorganohydrogensiloxanes need not be further detailed herein.

Preferably, reactant (i) and reactant (ii) are reacted together to form component (A) in the following manner:

Reactant (i), dispersed in organic solvent, is first thoroughly mixed with reactant (ii). The resultant mixture is heated to volatilize and remove the organic solvent from the mixture. Said heating is preferably done in two stages. In a first stage, heating and removal of some of the organic solvent is accomplished at ambient pressure. In a second stage heating and solvent removal are continued at reduced pressure. The second stage is preferably continued until the organic solvent has been substantially removed.

By substantially removed it is meant herein that the concentration of organic solvent is less than 1% by weight, based on the total weight of the mixture.

If reactant (i), as furnished, does not contain from 0.0018 to 0.018 equivalents of acid per gram, it is necessary to add the appropriate amount of a strong acid, such as HCl, to the reaction mixture.

The relative amounts of reactant (i) and reactant (ii) that are used are not overly critical. Generally, from 10 to 90 parts by weight of reactant (i) are reacted with 90 to 10 parts by weight of a reactant (ii). More preferably, roughly equal parts by weight of reactants (i) and (ii) are used, such as 40 to 60 parts by weight of reactant (i) and 60 to 40 parts by weight of reactant (ii), all of the above parts based on 100 total parts by weight of component (A) plus component (B).

Component (B) of the composition of the present invention is an aminofunctional silicone fluid polymer having the general unit formula $$R'_aQ_bSiO_{(4-a-b)/2}.$$

R' in said unit formula is selected from the group consisting of monovalent hydrocarbon radicals, hydroxy radicals, and alkoxy radicals. Suitable monovalent hydrocarbon radicals are as hereinabove defined for R of reactant (i) of component (A). More preferred R' radicals are lower alkyl radicals, such as methyl, ethyl, propyl, butyl, and the like. The methyl radical is especially preferred.

Alkoxy radicals suitable as R' radicals are radicals composed of alkyl radicals, such as methyl, ethyl, propyl, butyl, hexyl and the like, linked to the silicon atom of the above general unit formula by an Si—O— bond. Lower alkyl radicals are preferred, such as methyl, ethyl and propyl. Methyl radicals are especially preferred.

The sum of the values of a and b in the unit formula $R'_aQ_bSiO_{(4-a-b)/2}$ must be at least an average of one.

Polymers in which said sum has an average value between 1 and 1.9 are highly branched aminofunctional silicone fluid polymers.

Polymers in which said sum exceeds 2.1 are comparatively low molecular weight aminofunctional silicone fluid polymers. Such polymers contain a relatively high proportion of individual units wherein said sum is equal to 3. Units wherein said sum is 3 are commonly referred to as endblockers.

Polymers in which said sum is from 1.9 to 2.1 are referred to herein as polydiorganosiloxanes. Appropriate polydiorganosiloxanes for use as component (B) in the compositions of the present invention are preferably those in which R' in the general unit formula is the methyl radical. These preferred polydiorganosiloxanes have the general formula $$R''Me_2SiO(Me_2SiO)_x(MeQSiO)_ySiMe_2R'',$$

wherein, in said general formula,
Me represents the methyl radical;
R'' is selected from the group consisting of R'' radicals and Q radicals;
x has a value of from 0 to 7000;
y has a value of from 1 to 5000, and
the sum of the values of x and y is at least 18;
Q and R' are as hereinabove defined.

The use of polydiorganosiloxanes as component (B) is preferred in the compositions of the present invention.

Suitable Q radicals for component (B) include monoaminoalkyl radicals and diaminoalkyl radicals.

Monoaminoalkyl radicals have the general formula $-(C_mH_{2m})_nNH_2$ wherein each m and each n has an integer value of 1, 2, 3, or more.

Diaminoalkyl radicals have the general formula —$(C_mH_{2m})_nNH(C_qH_{2q})_pNH_2$, wherein m, n, q, and p each has an integer value of 1, 2, 3, 4, or more.

Examples of monoaminoalkyl radicals suitable for Q radicals of component (B) include —$CH_2NH_2$, —$CH_2CH_2NH_2$, —$CH_2CH(CH_3)NH_2$, —$CH_2CH(CH_3)CH_2NH_2$ and the like.

Examples of diaminoalkyl radicals suitable for Q radicals of component (B) include —$CH_2CH_2CH_2NHCH_2CH_2NH_2$, —$CH_2NHCH_2CH_2NH_2$, —$CH_2CH(CH_3)CH_2NHCH_2CH_2NH_2$, and the like.

Diaminoalkyl radicals are preferred Q radicals for component (B). The —$CH_2CH(CH_3)CH_2NHCH_2CH_2NH_2$ radical is particularly preferred.

Aminofunctional silicone fluid polymers suitable for use as component (B) are well known. Many such polymers are commercially available. Others can be synthesized from more basic starting materials.

For example, suitable aminofunctional silicone fluid polymers can be synthesized by hydrolyzing and condensing mono-, di-, or trialkoxysilanes that bear Q radicals and/or R' radicals as hereinabove described. Cyclosiloxanes with appropriate substituents can be compolymerized by a basic catalyst to obtain suitable aminofunctional silicone fluid polymers. In either of these two mentioned synthetic schemes, it is important that the proportions of alkoxysilanes and degree of substitution of the cyclosiloxanes be selected such that the resulting polymer is a fluid.

By a fluid, it is meant herein, a flowable material. Thus a suitable aminofunctional silicone fluid polymer can range from a low viscosity polymer of 10 centipoise or less, to a viscous gum of 20,000,000 centipoise or more.

While the relative amount of amine groups in the aminofunctional silicone fluid polymer is not known to be critical, a preferred range is from 1 mole percent to 10 mole percent.

The relative amounts of components (A) and (B) used in the composition of the present invention are not narrowly critical, and can range from 10 to 90 parts of each. It is preferred in most cases, however, that roughly equal quantities of components (A) and (B) are used. Thus a preferred composition comprises from 40 to 60 parts of component (A) and from 60 to 40 parts of component (B), all of the above parts being by weight, on the basis of 100 total parts of component (A) plus component (B).

The compositions of the present invention are prepared by mixing the desired amounts of component (A) and component (B) together to form a simple mixture. By simple mixture it is meant herein a uniform mixture having no gross visual discontinuity.

Suitable equipment to perform said mixing is very well known and widely available. Selection of a specific type of mixing equipment will be guided by the viscosity of the simple mixture.

For example, if the viscosity of the simple mixture is expected to be low, such as 10 to 500 centipoise, mechanical stirrers such as paddle stirrers can be used to produce a simple mixture of components (A) and (B). If a viscosity from 500 centipoise to 100,000 centipoise is expected, such equipment as three roll mills, sigmoid blade mixers, bread dough mixers and the like can also be used. If a viscosity in excess of 100,000 centipoise is expected, such equipment as two roll mills, or Baker Perkins ® mixers may be required.

In some cases, the use of dispensers, such as tubes or aerosal dispensers in which components (A) are (B) are separately provided to a mixing head, may be advantageous.

Upon formation of a simple mixture, the compositions of the present invention immediately begin to react chemically. Said compositions crosslink and evolve gas, thus producing a foam. Therefore, the present invention further relates to a method for producing a silicone foam, said method comprising mixing together (A) the reaction product of
  (i) an organosilicon resin consisting essentially of $R_3SiO_{\frac{1}{2}}$ units and $SiO_{4/2}$ units, wherein R represents a monovalent hydrocarbon radical, and the ratio of $R_3SiO_{\frac{1}{2}}$ unit to $SiO_{4/2}$ units is from 0.6/1 to 0.9/1, and
  (ii) a polyorganohydrogen siloxane; and (B) an aminofunctional silicone fluid polymer having the general unit formula $R'_aQ_bSiO_{(4-a-b)/2}$, wherein in said unit formula R' is selected from the group consisting of monovalent hydrocarbon radicals, hydroxy radicals, and alkoxy radicals;

Q is an aminofunctional radical;

the sum of the values of a and b is an average of at least 1;

there being, in said aminofunctional silicone fluid polymer, at least one Q radical.

Formation of a foam by the method of the present invention is rather rapid, so provision should be made to immediately convey the mixture to a suitable receptacle. Suitable receptacles include appropriate molds, and flat surfaces upon which foam in sheet form can be formed for later fabrication. Of course, the foam can be formed in place, such as for a foam gasket.

It is believed at this time that equipment such as that commonly used for reaction injection molding of, e.g. polyurethane foam, is suitable to produce foam articles of predictable configuration and density from the compositions of the present invention.

Formation of foam can be inhibited if the foam is supplied to the receptacle in a layer that is not thick enough for a foam to be produced. Thus, if a foam is desired, it is necessary that the mixture be supplied to the receptacle in a layer thicker than, e.g., 0.008 mm.

Supplying the mixture to a substrate in a layer thinner that 0.008 mm results in a protective coating. A more uniform coating can be produced by supplying the mixture in a layer 0.004 mm thick or less.

Those skilled in the art will recognize that the formation of a foam is also dependent upon the viscosity of the foaming mixture, the rate of reaction, and other factors. The above thickness values pertain to a mixture having a viscosity of 500 centipoise to 5000 centipoise. Said thickness values are here included merely as a general guide to those skilled in the art, and are not to be construed as placing any limits on the method of the present invention.

The compositions of the present invention can contain other, non-critical components. Examples of such non-critical components that are useful are: dyes and pigments, bacteriostats, bactericides, fungistats, perfumes, and fungicides: heat stability additives and flame retardants; other silicone fluids, such as polydimethylsiloxane fluids; mineral fillers; organic solvents; and the like.

For example, alpha, omega-dihydroxypolydimethylysiloxane can be added to the compositions of the present invention to render the resulting foam more flexible and softer. Mineral fillers, such as aluminum oxide or magnesium oxide, can be added to make resulting foams more fire resistant. $Al_2O_3.3H_2O$ has been found to render the foams of the present invention resistant to fire.

Other silicone fluids can be added in proportions from 0 to 250 parts by weight, based on 100 total parts of components (A) and (B). Examples of other silicone fluids include polydimethylsiloxanes, such as alpha, omega-dihydroxypolydimethylsiloxane, alpha, omega-bis-(trimethylsiloxy) polydimethylsiloxane, and other well known silicone fluids.

Mineral fillers can be added in proportions of from 1 to 250 parts by weight, based on 100 parts of components (A) plus (B).

While solventless compositions are generally preferred, the inclusion of organic solvents in the compositions of the present invention may be beneficial in some cases. Said organic solvent should be capable of forming a clear solution with component (A) or (B), or both. Examples of potentially useful organic solvents include hydrocarbon solvents, such as hexane, pentane, isooctane, naptha, benzene, toluene, xylene, and the like; alcohols such as methanol, ethanol, isopropanol, and the like; nitrogen containing solvents such as pyridine, piperidine, morpholine and the like; and other suitable solvents.

The compositions and method of the present invention provide useful silicone coatings and foams. Most advantageously, foam filled with mineral fillers, especially $Al_2O_3.3H_2O$, have a high degree of fire resistance. This resistance to fire suggests the use of filled foams of the present invention in such critical applications as non-burning insulative foam in energy plants, and in other residential, automotive, mining, marine and aviation applications.

The following examples are here presented to further illustrate the compositions and method of the present invention. These examples are not to be construed as limiting the present invention.

Parts and percentages in the examples are by weight unless otherwise specified. Me is used in the examples to denote the methyl radical.

EVALUATION PROCEDURES

Foam volume increase—A composition of the present invention was prepared in a glass bottle and the level of the liquid was noted. The composition then foamed and cured. The final level of the foam was noted and the increase in the foam level was calculated by the formula:

$$\% \text{ foam volume increase} = \frac{\text{Final level (mm)} - \text{original level (mm)}}{\text{original level (mm)}} \times 100$$

Foam Flexibility—Compositions of the present invention were spread thickly upon an aluminum panel. After a few seconds, cured foams bonded to the panel resulted. The panel was then flexed several times, and a number from 1 to 5 was assigned to describe the flexibility of the foam. A value of 1 represented a very flexible foam that showed no effects from the flexing. A value of 5 represented a very brittle foam that showed extensive cracking.

Cell Structure—Samples of foam were cut and visually observed. Terms describing the foam cell structure were recorded.

Adhesion—Adhesion reported herein was determined by, first, spreading a composition upon aluminum and glass substrates respectively. After a few seconds adherent foams formed. Adhesion was then determined in each case by digging at the foam with a thumbnail. The degree of adhesion thus found was recorded in descriptive terms.

Burning Characteristics—A piece of foam about 2.5 cm long and 1.2 cm wide and approximately 0.5 cm thick was held to a lit match and the results were recorded in descriptive terms.

Vertical Burning Test—Underwriter's Laboratory standard ANSI/UL 94-1979 was used herein to further characterize the burning behavior of some of the filled foams of the Examples.

In brief, test specimens 127 mm by 12.7 mm by approximately 1 mm thick were vertically suspended. A burner flame 19 mm high was then held directly beneath the suspended sample for 10 seconds. Char length (inches), Burn time, and Glow time were then measured after the 10 second exposure to the flame.

Burn time was the time that the sample continued to show a flame after removal of the burner flame. Glow time was the time that the charred sample glowed after the flame had extinguished.

MATERIALS

Synthesis of Component (A)

A mixture was charged to a vessel, equipped with a mechanical stirrer, said mixture consisting essentially of: (i) 41.2 parts of a polymer having the average formula $Me_3SiO(MeHSiO)_{35}SiMe_3$, wherein Me represents the methyl radical; (ii) 41.2 parts of an organosilicon resin composed of $Me_3SiO_{\frac{1}{2}}$ units and $SiO_{4/2}$ units, in the ratio of 0.6 $Me_3SiO_{\frac{1}{2}}$ units to 1 $SiO_{4/2}$ units; and 17.6 parts of xylene. Said mixture was then heated to a temperature of 150° C., and the pressure in the stirred vessel was reduced to, and held at 40 to 50 mm Hg. Heating under reduced pressure was continued for approximately 2 hours. Volatilized xylene was removed and condensed in a reservoir separate from the stirred vessel. After 2 hours, the reaction product was recovered. It was a substantially solvent free, liquid organosiloxane resin as described hereinabove as component (A) of the curable masses of the present invention.

Polymer 1

A solution consisting of
50% isopropanol,
6% glacial acetic acid, and
44% of the reaction product of
75 parts $HO(Me_2SiO)_{10}H$
10 parts $MeSi(OMe)_3$
15 parts $(MeO)_3SiCH_2CH_2CH_2NHCH_2CH_2NH_2$ Polymer 2

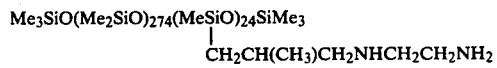

Polymer 3

Polymer 4

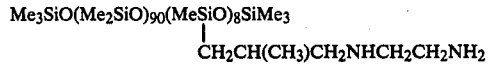

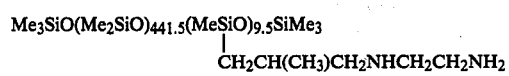

Polymer 5

$Me_3SiO(Me_2SiO)_{380}(MeSiO)_8SiMe_3$
           |
           $CH_2CH(CH_3)CH_2NHCH_2CH_2NH_2$

Polymer 6

$HO(Me_2SiO)_{680}H$

EXAMPLE 1

Fifty parts of component (A) and 50 parts of Polymer 1 were thoroughly mixed in a glass bottle with simple stirring. A portion of this mixture was poured onto a glass slide, and a separate portion was poured onto an aluminum panel. Foaming to a somewhat flexible foam occurred within a few seconds. See Table 2 for evaluation results. Adhesion to glass and to aluminum were found to be excellent.

EXAMPLES 2–15

The general procedure of Example 1 was followed for each of the compositions set forth in Table 1. Adhesion to glass and aluminum were found to be excellent in every case. Other evaluation results are set forth on Tables 2 and 3.

Example 14 also contained 1.25 parts of carbon black. Example 15 also contained 1.9 parts of carbon black.

TABLE 1

| | | Compositions | | | |
|---|---|---|---|---|---|
| Example | parts Component (A) | Component (B) | parts Component (B) | parts Polymer 6 | parts $Al_2O_3.3H_2O$ |
| 1 | 50 | polymer 1 | 50 | — | — |
| 2 | 50 | polymer 2 | 50 | — | — |
| 3 | 50 | polymer 3 | 50 | — | — |
| 4 | 50 | polymer 4 | 50 | — | — |
| 5 | 50 | polymer 5 | 50 | — | — |
| 6 | 70 | polymer 2 | 30 | — | — |
| 7 | 30 | polymer 2 | 70 | — | — |
| 8 | 50 | polymer 2 | 50 | 50 | — |
| 9 | 33 | polymer 2 | 67 | 33 | — |
| 10 | 50 | polymer 2 | 50 | — | 100 |
| 11 | 50 | polymer 3 | 50 | — | 40 |
| 12 | 50 | polymer 3 | 50 | — | 95 |
| 13 | 73.5 | polymer 3 | 26.5 | — | 95 |
| 14 | 50 | polymer 3 | 50 | — | 95 |
| 15 | 25 | polymer 3 | 75 | — | 98 |

TABLE 2

| | | Evaluation of Foams | | |
|---|---|---|---|---|
| Example | % Foam Volume Increase | Foam Flexibility | Cell Structure | Burning Characteristics |
| 1 | 500 | 3 | small, uniform | — |
| 2 | 400 | 1 | small, uniform | — |
| 3 | 500 | 2 | medium, large | vigorous burn, much afterglow |
| 4 | 300 | 4 | large, nonuniform | — |
| 5 | 200 | 1 | very small, uniform | — |
| 6 | 200 | 5 | small, uniform | — |
| 7 | 300–400 | 1 | medium large, uniform | — |
| 8 | 25 | 3 | large voids | — |
| 9 | 25 | 3 | large voids | — |
| 10 | 100 | 4 | small, uniform | no burn, no afterglow |
| 11 | 500 | 4 | medium, large | slow burn, slight afterglow |
| 12 | 300–500 | 4 | small, medium | no burn, no afterglow |
| 13 | 250–400 | 2 | small, medium | no burn, no afterglow |

TABLE 3

| | Vertical Burning Test UL 94 | | |
|---|---|---|---|
| Example | Char length | Burn Time (sec) | Glow Time (sec) |
| 10 | 0 | 0 | 0 |
| 11 | 5 | 75 | — |
| 14 | 0 | 0 | 0 |
| 15 | 0 | 0 | 0 |

That which is claimed is:

1. A non-foamed composition comprising a coating not thicker than 0.009 mm., said composition comprising, in combination
   (A) the reaction product of:
      (i) an organosilicon resin consisting essentially of $R_3SiO_{\frac{1}{2}}$ units and $SiO_{4/2}$ units, wherein R represents a monovalent hydrocarbon radical, and the ratio of $R_3SiO_{\frac{1}{2}}$ unit to $SiO_{4/2}$ units is from 0.6/1 to 0.9/1, and (ii) a polyorganohydrogensiloxane; and (B) an aminofunctional silicone fluid polymer having the general unit formula
$R'_a Q_b SiO_{(4-a-b)/2}$, wherein in said unit formula
R' is selected from the group consisting of monovalent hydrocarbon radicals, hydroxy radicals, and alkoxy radicals;
Q is an aminofunctional radical; the sum of the values of a and b is an average of at least 1; there being, in said aminofunctional silicone fluid polymer, at least one Q radical.

2. A composition as claimed in claim 1 wherein Q is a diaminoalkyl radical.

3. A composition as claimed in claim 2 wherein the diaminoalkyl radical is the $-CH_2CH(CH_3)CH_2NHCH_2CH_2NH_2$ radical.

4. A composition as claimed in claim 3 wherein the aminofunctional silicone fluid polymer is a polydiorganosiloxane having the general formula $R''Me_2SiO(Me_2SiO)_x(MeQSiO)_ySiMe_2R''$, wherein, in said general formula
Me represents the methyl radical
R" is selected from the group consisting of R' radicals and Q radicals
x has a value of from 0 to 7000,
y has a value of from 1 to 5000,
and the sum of the values of x plus y is at least 18.

5. A composition as claimed in claim 4 wherein there is present 40 to 60 parts of component (A) and 60 to 40 parts of component (B), based on 100 total parts of (A) and (B).

6. A composition as claimed in claim 5 further comprising a mineral filler.

7. A composition as claimed in claim 6 wherein there is present from 1 to 250 parts of a mineral filler.

8. A composition as claimed in claim 7 wherein the mineral filler is $Al_2O_2.3H_2O$.

9. A composition as claimed in claim 5 further comprising alpha, omega-dihydroxy polydimethylsiloxane.

* * * * *

UNITED STATES PATENT AND TRADEMARK OFFICE
CERTIFICATE OF CORRECTION

PATENT NO.  : 4,476,188
DATED       : October 9, 1984
INVENTOR(S) : John D. Blizzard, Terence J. Swihart It is certified that error appears in the above-identified patent and that said Letters Patent is hereby corrected as shown below:

In column 3, line 23, "$R_3SiO_{178}$" should read -- $R_3SiO_{1/2}$ --.

In column 12, line 18, "$Al_2O_2 \cdot 3H_2O$" should read --- $Al_2O_3 \cdot 3H_2O$ ---.

Signed and Sealed this

Seventh Day of May 1985

[SEAL]

Attest:

DONALD J. QUIGG

*Attesting Officer*   *Acting Commissioner of Patents and Trademarks*